(12) United States Patent
Karaoguz et al.

(10) Patent No.: US 8,965,386 B2
(45) Date of Patent: Feb. 24, 2015

(54) PROVIDING FEMTOCELL ACCESS VIA PERSONAL COMMUNICATION DEVICES

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 714 days.

(21) Appl. No.: 12/699,465

(22) Filed: Feb. 3, 2010

(65) Prior Publication Data
US 2011/0053569 A1   Mar. 3, 2011

Related U.S. Application Data

(60) Provisional application No. 61/239,327, filed on Sep. 2, 2009.

(51) Int. Cl.
*H04W 4/00* (2009.01)
*H04W 88/04* (2009.01)
*H04W 84/04* (2009.01)

(52) U.S. Cl.
CPC ............ *H04W 88/04* (2013.01); *H04W 84/045* (2013.01)
USPC ...................... 455/449; 455/414.1; 455/426.1; 455/422.1

(58) Field of Classification Search
USPC .......................... 455/449, 414.1, 426.1, 422.1
See application file for complete search history.

(56) References Cited

U.S. PATENT DOCUMENTS

| | | |
|---|---|---|
| 2002/0049061 A1 | 4/2002 | Pinola |
| 2006/0209795 A1 | 9/2006 | Chow |
| 2007/0121655 A1 | 5/2007 | Jin |
| 2008/0216145 A1 | 9/2008 | Barton |
| 2008/0244148 A1 | 10/2008 | Nix, Jr. |
| 2009/0042536 A1 | 2/2009 | Bernard |
| 2009/0061873 A1 | 3/2009 | Bao |
| 2009/0092081 A1 | 4/2009 | Balasubramanian |
| 2009/0098858 A1 | 4/2009 | Gogic |
| 2009/0164547 A1 | 6/2009 | Ch'ng |
| 2009/0279430 A1 | 11/2009 | Huber |
| 2009/0279519 A1 | 11/2009 | Brisebois |
| 2009/0288144 A1 | 11/2009 | Huber |
| 2009/0292799 A1 | 11/2009 | Eisener |
| 2009/0310561 A1* | 12/2009 | Grob et al. ..................... 370/331 |
| 2009/0316649 A1* | 12/2009 | Chen ............................... 370/331 |
| 2010/0144371 A1* | 6/2010 | Savoor ....................... 455/456.3 |
| 2010/0167734 A1 | 7/2010 | Jones |

\* cited by examiner

*Primary Examiner* — Justin Lee
(74) *Attorney, Agent, or Firm* — Sterne, Kessler, Goldstein & Fox P.L.L.C.

(57) ABSTRACT

A personal communication device may operate as a femtocell providing femtocell accessibility and services to a plurality of communication devices that are communicatively coupled to the personal communication device via one or more cellular connections. The personal communication device may connect to one or more broadband networks, via a plurality of wired and/or wireless interfaces, to enable the communication of packets when providing the femtocell accessibility and/or services. The personal communication device may support direct communications via the personal communication device when providing femtocell services. Signal strength may be boosted in the personal communication device when providing femtocell servicing via a signal booster that may be integrated within the personal communication device or may be externally attached to it during femtocell operations. The personal communication device may receive compensation for providing femtocell services to one or more of the plurality of communication devices.

20 Claims, 4 Drawing Sheets

PROVIDING FEMTOCELL ACCESS VIA PERSONAL COMMUNICATION DEVICES

CROSS-REFERENCE TO RELATED APPLICATIONS/INCORPORATION BY REFERENCE

This patent application claims benefit of U.S. Provisional Application Ser. No. 61/239,327, filed on Sep. 2, 2009.

FEDERALLY SPONSORED RESEARCH OR DEVELOPMENT

Not Applicable.

MICROFICHE/COPYRIGHT REFERENCE

Not Applicable.

FIELD OF THE INVENTION

Certain embodiments of the invention relate to communications. More specifically, certain embodiments of the invention relate to a method and system for providing Femtocell access via a personal communication device.

BACKGROUND OF THE INVENTION

A femtocell may be placed in private residences or in small business environments, and may be utilized, for example, for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks. Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing Femtocell access via a personal communication device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing Femtocell access via personal communication device. In various embodiments of the invention, A personal communication device may operate as a femtocell providing femtocell accessibility and/or services to a plurality of communication devices when each of the plurality of communication devices is communicatively coupled to the personal communication device via one or more cellular connections. The femtocell services may comprise communication of packets to and/or from the plurality of communication devices during cellular communication sessions in the plurality of communication devices. The personal communication device may connect to one or more broadband networks to enable the communication of packets when providing femtocell accessibility and/or services to the plurality of communication devices. Exemplary broadband networks may comprise satellite networks, cable networks, DVB networks, Internet, and/or local or wide area networks. The personal communication device may establish connections to the broadband networks via a plurality of wired and/or wireless interfaces supported via the personal communication device. Exemplary wireless interfaces may comprise wireless personal area network (WPAN) interfaces, wireless local area network (WLAN) interfaces, satellite interfaces, Ultra-wide band (UWB) interfaces, and/or 60 GHz interfaces.

The personal communication device may also support direct communications via the personal communication device by the device's user(s) when providing femtocell accessibility and/or services to the plurality of communication devices. Transmission and/or reception signal strength may be boosted in the personal communication device when providing femtocell accessibility and/or services, to improve femtocell operations via the personal communication device for example. The signal strength boosting may be performed via a signal booster that may be integrated within the personal communication device or may be externally attached to the personal communication device during femtocell operations. The personal communication device may receive compensation for providing femtocell accessibility and/or services to one or more of the plurality of communication devices. The compensation received by the personal communication device may comprise payment and/or credit for providing the femtocell accessibility and/or services.

Figure 1A:
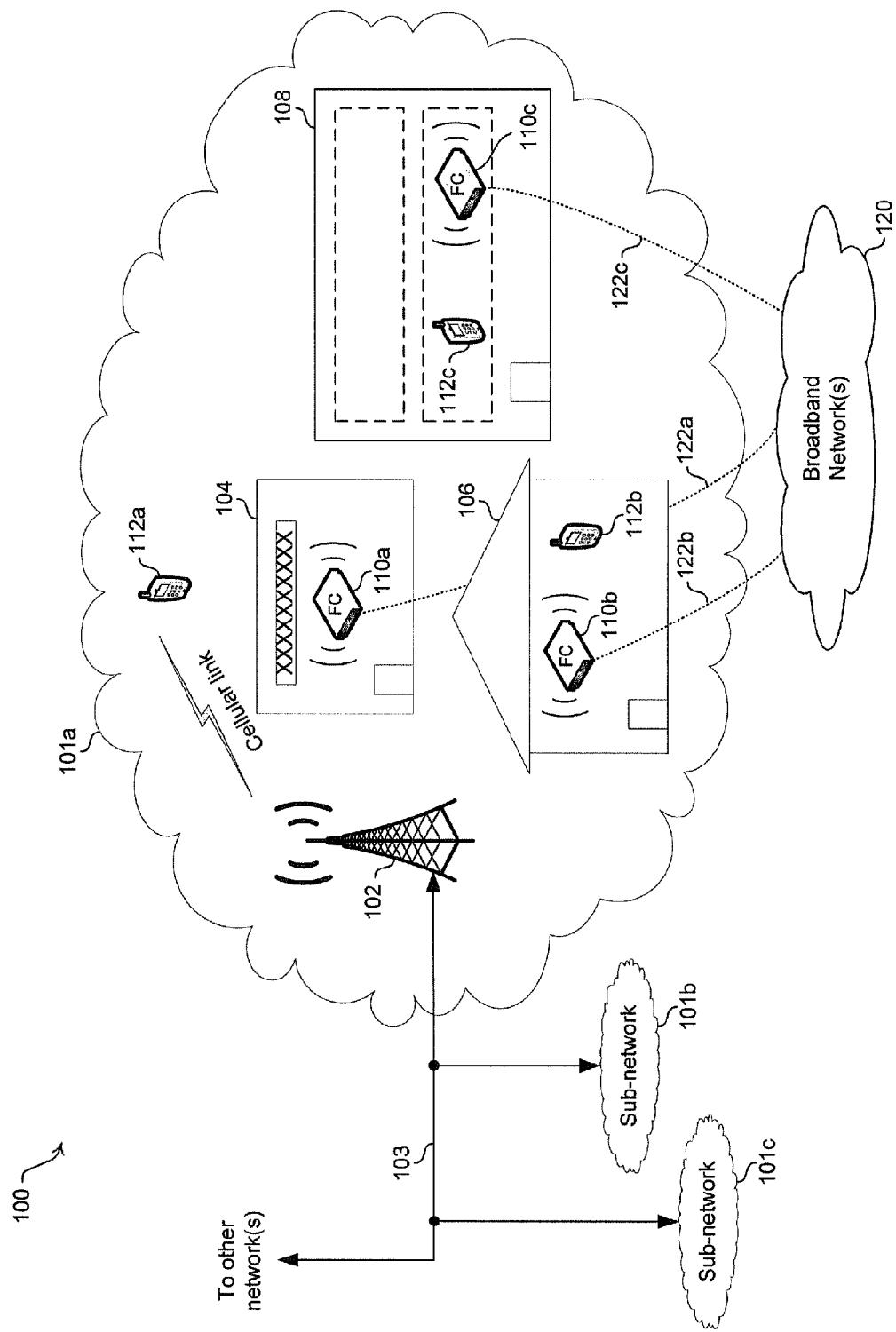
FIG. 1A is a diagram illustrating an exemplary cellular network that support use of femtocells, in accordance with an embodiment of the invention.

FIG. 1A is a diagram illustrating an exemplary cellular network that support use of femtocells, in accordance with an embodiment of the invention. Referring to FIG. 1A, there is shown a network 100 comprising a plurality of sub-networks 101a, . . . , 101c. The exemplary sub-network 101a may comprise a base station 102, femtocells 110a, . . . , 110c, which are collectively referred to herein as femtocells 110, and communication devices 112a and 112c, which are collectively referred to herein as communication devices 112. The femtocells 110 may be installed in one or more commercial properties 104, one or more residential properties 106, and/or one or more multi-tenant properties 108. Also shown in FIG. 1A is broadband networks 120. The broadband networks 120 may comprise a plurality of broadband capable networks, which may include, for example, satellite networks, cable networks, DVB networks, the Internet, and/or similar local or wide area networks, which are capable of conveying data which may comprise multimedia. The broadband connections 122a, . . . , 122c, which are collectively referred to herein as broadband connections 122, may comprise optical, wired, and/or wireless links.

The commercial property 104 may comprise, for example, a store, restaurant, an office, and/or a municipal building. The residential property 106 may comprise, for example, a single-family home, a home office, and/or a town-house. The multi-tenant property 108 may comprise a property in multi-unit residential and/or commercial properties, such as apartments, condos, hotels, and/or high rises.

The base station 102 may comprise suitable logic, interfaces, circuitry, and/or code that may be operable to communicate data wirelessly utilizing one or more cellular standards such as IS-95, CDMA2000, GSM, UMTS, TD-SCDMA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with communication devices such as the communication devices 112. Exemplary cellular standards supported by the base station 102 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocells 110 may each comprise suitable logic, interfaces, circuitry, and/or code that may be operable to communicate wirelessly utilizing one or more cellular standards such as IS-95, CDMA2000, GSM, UMTS, TD-SCDMA, extensions thereto, and/or variants thereof. In this regard, the femtocells 110 may each communicate with communication devices such as the communication devices 112. Exemplary cellular standards supported by the femtocells 110 may be specified in the International Mobile Telecomunnications-2000 (IMT-2000) standard and/or developed by the 3$^{rd}$ generation partnership project (3GPP) and/or the 3$^{rd}$ generation partnership project 2 (3GPP2). Additionally, the femtocells 110 may each comprise suitable logic, interfaces, circuitry, and/or code that may be operable to communicate over IP capable networks, for example via the broadband networks 120 via the broadband connections 122a, . . . , 122c. Accordingly, the femtocells 110 may be operable to transcode one or more first packets for communication between a cellular and non-cellular interface.

The communication devices 112 may each comprise suitable logic, interfaces, circuitry, and/or code that may be operable to communicate utilizing one or more communication standards, including wired and/or wireless protocols. Exemplary wireless protocols that may be supported via the communication devices 112 may comprise Bluetooth, ZigBee, WLAN (IEEE 802.11), Worldwide Interoperability for Microwave Access (WiMAX), Ultra-wideband (UWB), and/or 60 GHz protocol. The communication devices 112 may also be operable to provide communication utilizing one or more cellular standards. In this regard, the communication devices 112 may each be operable to transmit and/or receive data via the cellular network 100. Exemplary communication devices comprise cell (mobile) phones, laptops, and personal media players. The communication devices 112 may be enabled to receive, process, and present multimedia content and may additionally be enabled to run a network browser or other applications for providing Internet services. Additionally, the communication devices 112 may comprise one or more clocks which may be utilized to determine when to process, present, and/or transmit data. In various embodiments of the invention, at least some of the communication devices 112 may be operable to provide femtocell functionality. In this regard, the communication devices 112 may each comprise a stack such as a femtostack, that may enable other communication devices within operational proximity to connect to, and perform femto communication via the communication devices 112. Exemplary communication may comprise voice and/or data communication. Exemplary data communication may comprise transfer of multimedia information comprising video, still images, and text information.

In operation, the communication devices 112 may establish cellular connectivity with the sub-network 101a. In some instances, the communication devices 112 may establish direct cellular connectivity and receive cellular services from one or more base stations. For example, the communication device 112a may establish cellular connectivity via direct connections with the base station 102. In other instances, however, some of the communication devices 112 may establish cellular connectivity indirectly, via the femtocells 110 in the sub-network 101a. For example, the communication device 112b may establish cellular connectivity within the residential property 106 via the femtocell 110b. Similarly, the communication device 112c may establish cellular connectivity within the multi-tenant property 108 via the femtocell 110c. In this regard, the femtocells 110 may be operable to receive data from one or more IP capable networks, such as the broadband networks 120 via one or more broadband connections 122, transcode or otherwise process the received data, and transmit the transcoded data to one or more communication devices 112 via one or more cellular connections. Similarly, the femtocells 110, may be operable to receive data from one or more communication devices 112 via one or more cellular connections, transcode or otherwise process the received data, and transmit the transcoded data to one or more IP capable networks such as the broadband networks 120 via one or more broadband connections 122.

In various embodiments of the invention, the stack such as the femtostack may be integrated within one or more of the communication devices 112 to enable these devices to provide femtocell functionality. For example, the stack such as the femtostack may be integrated within the communication device 112b such that the communication device 112b may be operable to provide femtocell accessibility, in addition to or in lieu of the femtocell 110b, within the residential property 106. Accordingly, the communication device 112b may be able to provide cellular services and/or connectivity to other communication devices that may be located within the residential property 106. In this regard, the communication device 112b may be operable to obtain connection(s) to the broadband networks 120 to enable reception and/or transmission of data packets via the serviced communication devices within the residential property 106. The connections between the communication device 112b and the broadband networks 120 may be substantially similar to the broadband connection 122, and may be optical, wired, and/or wireless based. For example, the communication device 112b may connect to the broadband networks 120 directly, via Ethernet based wired connection for example. Alternatively, the communication device 112b may utilize a wireless connection to connect to other devices that in turn provide direct connectivity to the broadband networks 120. In this regard, the communication device 112b may establish connectivity to the broadband networks 120 via WiFi hub and a DSL modem, for example.

During operations as femtocell, the communication device 112b may stop providing direct communication services to device users. In some embodiments of the inventions, however, the communication device 112b may continue to provide direct communication services during femtocell servicing operations, and may even allow providing femtocell servicing to femto calls requested via the communication device 112b itself.

Figure 1B:
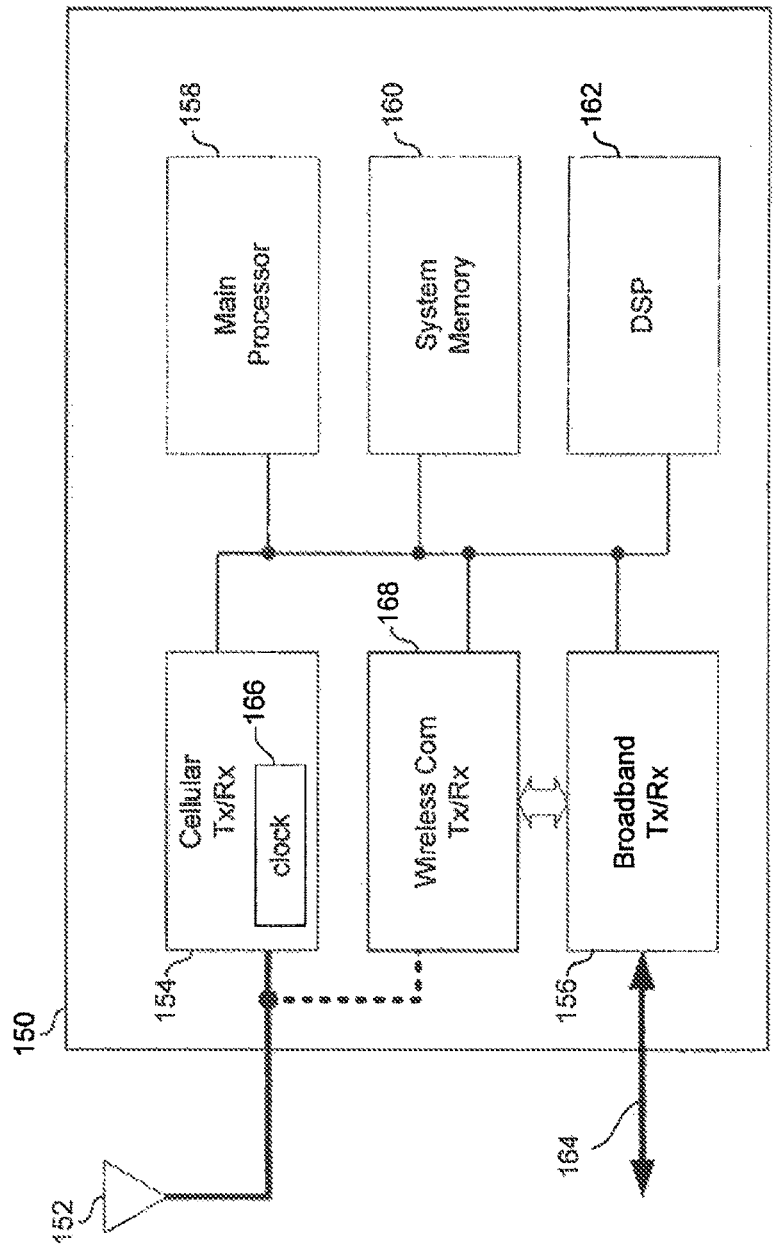
FIG. 1B is a block diagram illustrating an exemplary femtocell system, in accordance with an embodiment of the invention.

FIG. 1B is a block diagram illustrating an exemplary femtocell system, in accordance with an embodiment of the invention. Referring to FIG. 1B, there is shown a femtocell system 150 comprising an antenna subsystem 152, a cellular transmitter and/or receiver (Tx/Rx) module 154, a broadband transmitter and/or receiver (Tx/Rx) module 156, a main processor 158, a system memory 160, a digital signal processor (DSP) 162, a network link 164, and a clock sub-module 166. The femtocell system 150 may also comprise a wireless communication transmitter and/or receiver (Tx/Rx) module 168. The femtocell system 150 may be integrated into the femtocells 110 described with respect to FIG. 1A to enable performing femtocell servicing operations.

The antenna subsystem 152 may be operable to transmit and/or receive radio frequency (RF) signals. The antenna subsystem 152 may be operable, for example, to transmit and/or receive of cellular or other wireless communication standard RF signals. Although a single antenna is illustrated, the invention is not so limited. In this regard, the cellular Tx/Rx module 154 may utilize a common antenna for transmission and reception, may utilize different antennas for transmission and reception, and/or may utilize a plurality of antennas for transmission and/or reception.

The cellular Tx/Rx module 154 may comprise suitable logic, interfaces, circuitry, and/or code that may be operable to transmit and/or receive voice and/or data utilizing one or more cellular standards. The cellular Tx/Rx module 154 may be operable to perform amplification, down-conversion, filtering, demodulation, and analog to digital conversion of received cellular signals. The cellular Tx/Rx module 154 may be operable to perform amplification, up-conversion, filtering, modulation, and digital to analog conversion of transmitted cellular signals. The cellular Tx/Rx module 154 may support communication over a plurality of communication channels utilizing time division multiple access (TDMA) and/or code division multiple access (CDMA). Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2).

The wireless communication Tx/Rx module 168 may comprise suitable logic, interfaces, circuitry, and/or code that may be operable to perform wireless communication based on one or more cellular standards. Exemplary wireless standards may comprise WPAN, WEAN, WiMAX, and/or UWB based protocols. The wireless communication Tx/Rx module 168 may be operable to perform amplification, down-conversion, filtering, demodulation, and/or analog to digital conversion of received wireless signals, based on applicable protocol(s). The wireless communication Tx/Rx module 168 may be operable to perform amplification, up-conversion, filtering, modulation, and/or digital to analog conversion of transmitted wireless signals, based on applicable protocol(s). The wireless communication Tx/Rx module 168 may share the antenna subsystem 152 with the cellular Tx/Rx module 154, and/or may utilized dedicated antenna(s).

The broadband Tx/Rx module 156 may comprise suitable logic, interfaces, circuitry, and/or code that may be operable to transmit voice and/or data in adherence with one or more broadband communication standards. The broadband Tx/Rx module 156 may be operable to perform amplification, down-conversion, filtering, demodulation, and analog to digital conversion of received signals. The broadband Tx/Rx module 156 may be operable to perform amplification, up-conversion, filtering, modulation, and digital to analog conversion of transmitted signals. In various exemplary embodiments of the invention, the broadband Tx/Rx module 156 may transmit and/or receive voice and/or data over the link 164, which may be a T1/E1 line, passive optical network, DSL, cable television infrastructure, satellite broadband internet connection, satellite television infrastructure, and/or Ethernet.

The main processor 158 may comprise suitable logic, interfaces, circuitry, and/or code that may enable processing data and/or controlling operations of the femtocell system 150. The invention may not be limited to a specific processor, but may comprise for example, a general purpose processor, a specialized processor or any combination of suitable hardware, firmware, software and/or code, which may be enabled to support and/or control operations of the femtocell system 150. With regard to processing data, the main processor 158 may enable packetization, de-packetization, transcoding, reformatting, and/or otherwise processing data received from and/or to be transmitted by the cellular Tx/Rx module 154 and/or from the broadband Tx/Rx module 156. In this regard, the main processor 158 may perform or control operations to transcode packets from a first format to one or more other formats. With regard to controlling operations of the femtocell system 150, the main processor 158 may be enabled to provide control signals to the various other blocks comprising the femtocell system 150. The main processor 158 may also control data transfers between various portions of the femtocell system 150. Additionally, the main processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx module 154, the broadband Tx/Rx module 156, the DSP 162, and/or the system memory 160.

The system memory 160 may comprise suitable logic, interfaces, circuitry, and/or code that may enable permanent and/or non-permanent storage, retrieval, and/or programming of information that includes data, parameters and/or code that may effectuate the operation of the femtocell system 150. In this regard, the system memory 160 may comprise different memory technologies, including, for example, read-only memory (ROM), random access memory (RAM), and/or Flash memory. The parameters may comprise configuration data and the code may comprise operational code such as software and/or firmware, but the information need not be limited in this regard. Moreover, the parameters may include adaptive filter and/or block coefficients. Additionally, the system memory 160 may buffer or otherwise store received data and/or data to be transmitted. In this regard, the system memory 160 may enable packetization, de-packetization, transcoding, reformatting, and/or otherwise processing data received from and/or to be transmitted by the cellular Tx/Rx module 154 and/or from the broadband Tx/Rx module 156. In various embodiments of the invention, the system memory 160 may comprise one or more look-up tables or other data structures which may comprise information for controlling operation of the femtocell system 150.

The DSP 162 may comprise suitable logic, interfaces, circuitry, and/or code operable to perform computationally intensive processing of data during communication operations. The DSP 162 may encode, decode, modulate, demodulate, encrypt, decrypt, scramble, descramble, and/or otherwise process data. The DSP 162 may be enabled to adjust a modulation scheme, error coding scheme, and/or data rates of transmitted cellular signals data.

The clock sub-module 166 may comprise suitable logic, interfaces, circuitry, and/or code that may be operable to generate and/or utilize one or more periodic signals to control synchronous operations and/or keep track of time. In various embodiments of the invention, the clock sub-module 166 may comprise one or more oscillators, phase locked loops, and/or direct digital frequency synthesizers. While the clock sub-module 166 is shown as subcomponent of the cellular Tx/Rx module 154, the invention need not be so limited, and the clock sub-module 166 may be implemented within other modules or component, or as a separate component within the femtocell system 150.

In operation, the femtocell system 150 may be operable to enable performing femtocell operations. In this regard, the femtocell system 150 may simulate the operations of cellular base stations by providing connectivity, via broadband connections, to cellular service providers' networks. The femtocell system 150 may communicate, for example, data between serviced communication devices that are communicatively coupled to the femtocell system 150 and cellular providers' backbone networks. For example, downlink datastreams communicated to the serviced communication devices via the femtocell system 150 may be received via the broadband Tx/Rx module 156. The received datastreams may be transcoded, formatted, and/or otherwise processed by the main processor 158, the system memory 160, and/or the DSP 162, and may then be transmitted, to the serviced communication devices, via the cellular Tx/Rx module 154. Similarly, uplink datastreams communicated by the serviced communication devices via the femtocell system 150 may be received via the cellular Tx/Rx module 154. The received datastreams may then be transcoded, formatted, and/or otherwise processed by the main processor 158, the system memory 160, and/or the DSP 162, and may then be forwarded, to the cellular providers' networks, via the broadband Tx/Rx module 156. Where the broadband connectivity is obtained wirelessly, the wireless communication Tx/Rx module 168 may be operable, in conjunction with the broadband Tx/Rx module 156, to provide wireless connections that enable broadband communication via the broadband Tx/Rx module 156.

In an exemplary embodiment of the invention, the femtocell system 150, and/or elements thereof, may be integrated within a personal communication device to enable use of the device as a femtocell. For example, the femtocell system 150, or parts thereof, and/or a stack such as a femtostack may be integrated into the communication device 112b of FIG. 1A such that the communication device 112b may be operable to provide femtocell accessibility and/or servicing, in addition to or in lieu of the femtocell 110b, within the residential property 106. Accordingly, the communication device 112b may be able to provide cellular services and/or establish cellular connectivity, via the cellular Tx/Rx module 154, to other communication devices that may be located within the residential property 106.

The cellular Tx/Rx module 154 may enable the communication device 112b to establish multiple cellular connections to a plurality of communication devices concurrently. The communication device 112b may also be operable to obtain connection(s) to the broadband networks 120, via the broadband Tx/Rx module 156, to enable reception and/or transmission of data packets by the serviced communication devices within the residential property 106. In some instances, the wireless communication Tx/Rx module 166 may enable the communication device 112b to obtain broadband connectivity via wireless connections, such as wireless personal area network (WPAN) links, wireless local area network (WLAN) links, Ultra-wide band (UWB) interfaces, and/or 60 GHz based links, for example. During femtocell servicing operations via the communication device 112b, the main processor 158, the system memory 160, and/or the DSP 162 may be used, within the communication device 112b, to perform necessary coding, transcoding, formatting, and/or processing operations during routing of data packets, via the communication device 112b, between the serviced communication devices and the broadband networks 120.

Figure 2:
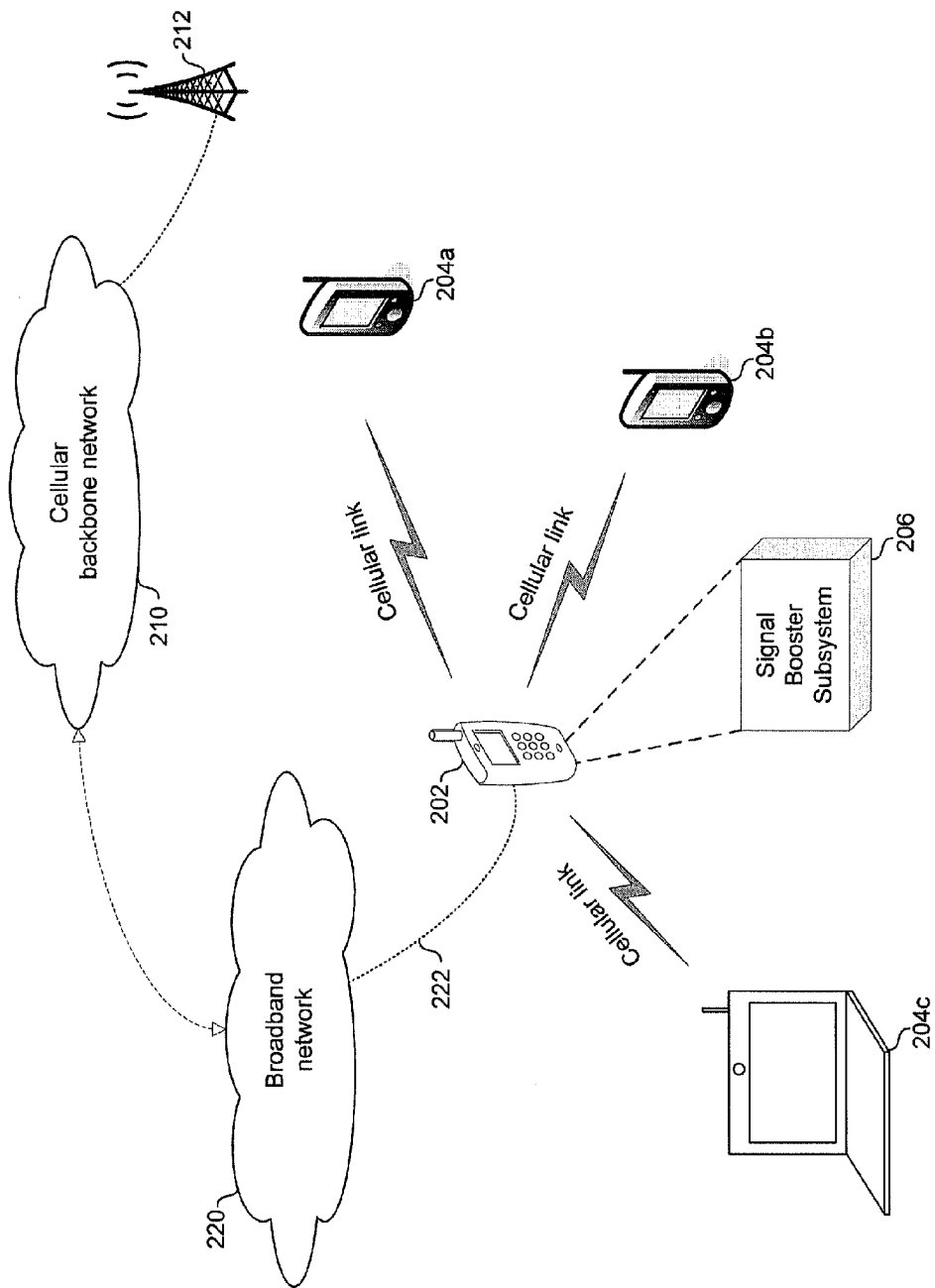
FIG. 2 is a block diagram that illustrates an exemplary personal communication device operating as a femtocell and providing femtocell accessibility and services to a plurality of communication devices, in accordance with an embodiment of the invention.

FIG. 2 is a block diagram that illustrates an exemplary personal communication device operating as a femtocell and providing femtocell accessibility and services to a plurality of communication devices, in accordance with an embodiment of the invention. Referring to FIG. 2, there is shown a servicing personal communication device (servicing PCD) 202, a plurality of communication devices 204a, ..., 204c, a signal booster subsystem 206, a cellular backbone network 210, a broadband network 220, an IP link 222.

The servicing personal communication device 202 may comprise suitable logic, interfaces, circuitry, and/or code to enable communication via one or more communication standards, including wired and/or wireless protocols. In this regard, the servicing personal communication device 202 may be operable to communicate data utilizing one or more cellular standards, including, for example, IS-95, CDMA2000, GSM, UMTS, TD-SCDMA, extensions thereto, and/or variants thereof. The servicing personal communication device 202 may also be operable to utilize other, non-cellular, wireless standards including, for example, wireless personal area network (WPAN) protocols, WLAN (IEEE 802.11) protocols, Worldwide Interoperability for Microwave Access (WiMAX), Ultra-wideband (UWB), and/or 60 GHz protocols. In an exemplary aspect of the invention, the servicing personal communication device 202 may be operable to provide femtocell servicing to a plurality of communication devices that are communicatively coupled to the servicing personal communication device 202. In this regard, the servicing personal communication device 202 may comprise, for example, the femtocell system 150, or elements thereof, to enable such femtocell servicing operations via the servicing personal communication device 202. While the servicing personal communication device 202 may correspond to a commonly used communication device, a cell phone for example, the servicing personal communication device 202 may be optimized for providing femtocell servicing operations by supporting multiple concurrent cellular connections.

The signal booster subsystem 206 comprise suitable logic, interfaces, circuitry, and/or code that may be utilized to improve communication operations of the servicing personal communication device 202. The signal booster subsystem 206 may enable boosting strength of signals transmitted and/or received via the servicing personal communication device 202 to increase the operational range, data transfer bandwidth, and/or number of devices that may be serviced concurrently by the servicing personal communication device 202. The signal booster subsystem 206 may be integrated directly into the servicing personal communication device 202, as component thereof. Alternatively, the signal booster subsystem 206 may be attached to the servicing personal communication device 202, when the device is operated as a femtocell, via one of a plurality of supported serial and/or parallel interfaces. A parallel interface may be, for example, peripheral card interconnect (PCI), where a serial interface may be, for example, universal serial bus (USB).

Each of the communication devices 204a, ..., 204c may comprise suitable logic, interfaces, circuitry, and/or code that may be operable to communicate via, at least, one or more cellular standards. Exemplary communication devices comprise cell (mobile) phones, laptops, and/or personal media players. The communication devices 204a, ..., 204c may be enabled to receive, process, and present multimedia content and may additionally be enabled to run a network browser or other applications for providing Internet services. In an exemplary aspect of the invention, the communication devices 204a, ..., 204c may obtain femtocell servicing via the servicing personal communication device 202. In this regard, the communication devices 204a, ..., 204c may each be operable to transmit and/or receive data from and/or to the cellular backbone network 210 via the servicing personal communication device 202.

The cellular backbone network 210 may comprise suitable logic, interfaces, circuitry, and/or code that may be provide backbone connectivity and/or overall management or control in a cellular service provider's network. For example, the cellular backbone network 210 may provide, control, management, and/or message routing among components of the cellular service provider's network. The cellular backbone network 210 may enable connecting, for example, a plurality of base stations and/or femtocells to provider overall connectivity in a cellular system. In this regard, the cellular backbone network 210 may provide backbone connectivity between a base station 212, which may be substantially similar to the base station 102 of FIG. 1A, and the servicing personal communication device 202 when the latter is utilized to provide femtocell servicing.

The broadband network 220 may be similar to the broadband networks 120, substantially as described with regard to FIG. 1A, and may provide broadband based connectivity to enable conveying data among a plurality of systems and/or devices, which may be capable of connecting to the broadband network 220, via, for example, the broadband link 222.

The broadband link 222 may comprise optical, wired, and/or wireless links. The broadband network 220 and/or the broadband link 222 may be operable, for example, to provide IP base connectivity between the servicing personal communication device 202 and the cellular backbone network 210 to facilitate femtocell servicing operations via the servicing personal communication device 202.

In operation, the servicing personal communication device 202 may be utilized as a femtocell, and may be operable to provide femtocell servicing to the communication devices 204a, ..., 204c, which may be communicatively coupled to the servicing personal communication device 202 via cellular links. Establishing cellular links may be initiated either by the servicing personal communication device 202 or by each the communication devices 204a, ..., 204c, when femtocell servicing is requested. To enable providing femtocell services, the servicing personal communication device 202 may establish broadband connectivity, via the broadband link 222, to the broadband network 220. In this regard, the servicing personal communication device 202 may obtain broadband connectivity wirelessly or via wired connections. Exemplary wired connections may comprise cable based connections, whereas wireless connections may be established via WLAN based connection(s) that may be supported via a DSL cable modem and a WiFi router, for example. The servicing personal communication device 202 may receive, via the cellular links, datastreams sent by the communication devices 204a, ..., 204c, and may process the received datastreams to enable forwarding them to the cellular backbone network 210 via the broadband network 220. Similarly, the servicing personal communication device 202 may receive, via the broadband network 220, datastreams communicated through the cellular backbone network 210 and destined for the communication devices 204a, ..., 204c.

The servicing personal communication device 202 may process the received downlink datastreams and forward them to the communication devices 204a, ..., 204c via the cellular links. While the servicing personal communication device 202 may generally be utilized as end-user communication devices, during operation as a femtocell, the servicing personal communication device 202 may stop providing direct communication services to the device's user(s). In some embodiments of the invention, however, the servicing personal communication device 202 may continue to provide direct communication services during femtocell servicing operations. The servicing personal communication device 202 may also allow concurrent femtocell servicing of the device's users for calls requested via the servicing personal communication device 202 itself—i.e., the servicing personal communication device 202 may logically be treated as two independent entities, servicing and served devices.

In an exemplary embodiment of the invention, the signal booster subsystem 206 may be utilized to improve operations of the servicing personal communication device 202. In this regard, the signal booster subsystem 206 may enable increasing the operational range, data transfer bandwidth, and/or number of devices that may be serviced concurrently by the servicing personal communication device 202. The signal booster subsystem 206 may be integrated directly into the servicing personal communication device 202, or it may be attached, via a USB interface for example, to the servicing personal communication device 202, when the device is utilized as a femtocell. For example, the servicing personal communication device 202 may initially be only operable to service the communication device 204a, for instance due to limited range. Use of the signal booster subsystem 206, however, may enable the servicing personal communication device 202 to additionally service the communication devices 204b and 204c.

In an exemplary embodiment of the invention, femtocell servicing operations via the servicing personal communication device 202 may be incentivized. The servicing personal communication device 202 may generally be utilized to provide femtocell servicing, for free, within a private residence for example, to other devices used and/or operated by the user of the servicing personal communication device 202 and/or other members of the same household. Alternatively, the servicing personal communication device 202 may also be utilized to offer cellular accessibility and servicing to other users who may not be able to obtain cellular connectivity via their communication devices in exchange for compensation and/or credit. In this regard, the femtocell servicing operations via the servicing personal communication device 202 may be incentivized by enabling the servicing personal communication device 202, and/or its user(s), to claim pay and/or credit for providing femtocell services. The credit received for providing femtocell services may be utilized, for example, to compensate for costs otherwise charged by a cellular service provider when the servicing personal communication device 202 is utilized as user end-point device. To track crediting during femtocell servicing, the cellular backbone network 210 may enable creation and/or management of user accounts corresponding to the devices utilized during femtocell servicing operations, which may then be adjusted to bill and/or debit their users for services provided via the servicing personal communication device 202. Accordingly, the servicing personal communication device 202 is operable to request credit and/or billing adjustments for servicing the communication devices 204a, ..., 204c. In instances where the cellular service provider for the servicing personal communication device 202 may not directly manage and/or maintain user accounts for one or more of the devices receiving and/or providing femtocell services, where users of such devices are customers of other providers, user related information may be exchanged between the cellular service providers to enable performing necessary billing and/or crediting adjustments. Alternatively, a centralized depository may be utilized to enable performing all user related crediting operations.

Figure 3:
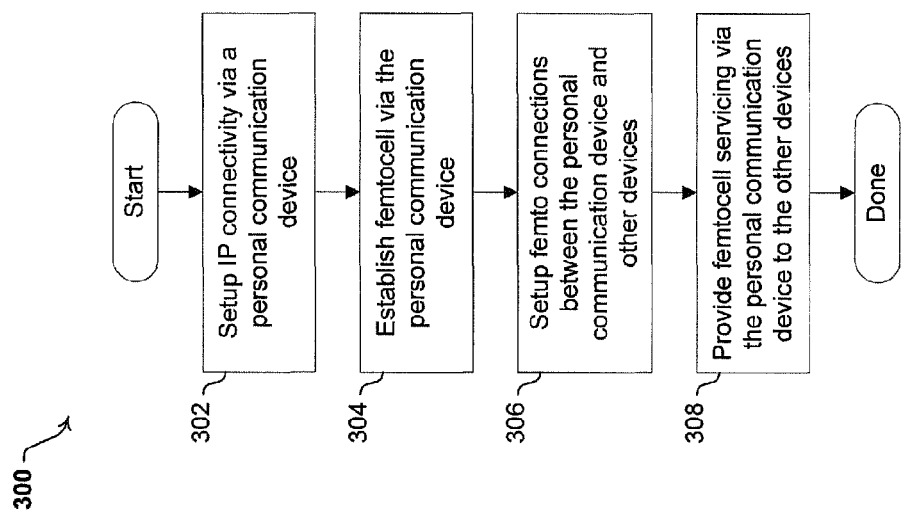
FIG. 3 is a flow chart that illustrates exemplary femtocell servicing via a personal communication device, in accordance with an embodiment of the invention.

FIG. 3 is a flow chart that illustrates exemplary femtocell servicing via a personal communication device, in accordance with an embodiment of the invention. Referring to FIG. 3, there is shown a flow chart 300 comprising a plurality of exemplary steps that may be performed to enable providing femtocell servicing via a personal communication device.

In step 302, broadband (e.g., IP) connectivity may be established via a personal communication device. For example, the servicing personal communication device 202 may establish broadband connectivity to the broadband network 220, via the broadband link 222. In step 304, a femtocell may be established via the personal communication device after establishing broadband connectivity. for example, after establishing broadband connectivity, the servicing personal communication device 202 may establish a femtocell that may be enable servicing the communication devices 204a, ..., 204c. In step 306, the personal communication device may establish femto connections with other devices that are communicatively coupled to the personal communication device. For example, the servicing personal communication device 202 may establish cellular links with the communication devices 204a, ..., 204c. The establishment of cellular links may be initiated either by the servicing personal communication device 202 or by the communication devices 204a, ..., 204c. In step 308, the servicing personal servicing device 202 may provide femtocell servicing to the communication devices 204a, . . . , 204c.

Various embodiments of the invention may comprise a method and system for providing Femtocell access via personal communication device. The servicing personal communication device 202 may operate as a femtocell providing femtocell accessibility and/or services to the communication devices 204a, . . . , 204c when each of the communication devices 204a, . . . , 204c is communicatively coupled to the servicing personal communication device 202 via one or more cellular connections, via the cellular Tx/Rx module 154 for example. The femtocell services may comprise communication of packets to and/or from the communication devices 204a, . . . , 204c during cellular communication sessions in the communication devices 204a, . . . , 204c. The servicing personal communication device 202 may connect to the broadband network 220, via the broadband link 222, to enable the communication of packets when providing femtocell accessibility and/or services to the communication devices 204a, . . . , 204c via the Broadband Tx/Rx module 156. The servicing personal communication device 202 may establish broadband connectivity via a plurality of wired and/or wireless interfaces supported, for example, via wireless communication Tx/Rx module 168 in the servicing personal communication device 202. Exemplary wireless interfaces may comprise wireless personal area network (WPAN) interfaces, wireless local area network (WLAN) interfaces, satellite interfaces, Ultra-wide band (UWB) interfaces, and/or 60 GHz interfaces. The servicing personal communication device 202 may also support direct communications via the servicing personal communication device 202 by device's users when providing femtocell accessibility and/or services to the communication devices 204a, . . . , 204c. Transmission and/or reception signal strength may be boosted in the servicing personal communication device 202 when providing femtocell accessibility and/or services, to improve femtocell operations via the servicing personal communication device 202 for example. The signal strength boosting may be performed via the signal booster subsystem 206, which may be integrated within the servicing personal communication device 202 or may be externally attached to the servicing personal communication device 202 during femtocell operations. The servicing personal communication device 202 may receive compensation for providing femtocell accessibility and/or services to one or more of the communication devices 204a, . . . , 204c. The compensation received by the servicing personal communication device 202 may comprise payment and/or credit for providing the femtocell accessibility and/or services.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for providing Femtocell access via personal communication device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile communications device, comprising:
a femtocell system configured:
to communicate with a cellular network via a first connection in a first mode of operation and with the cellular network through a broadband network via a second connection in a second mode of operation,
to communicate communication signals between the cellular network and a second mobile communications device, the communication signals being communicated between the cellular network and the mobile communications device via the second connection in the second mode of operation, and
to stop the first connection in the second mode of operation.

2. The mobile communications device of claim 1, further comprising:
a signal booster configured to boost a strength of the communication signals in the second mode of operation.

3. The mobile communications device of claim 1, wherein the second connection comprises:
a local network connection, the femtocell system being further configured to route a call placed from the second mobile communications device through the local network connection.

4. The mobile communications device of claim 3, wherein the local network connection comprises:
a satellite network, a cable network, a digital video broadcasting (DVB) network, internet, a local area network (LAN), a wide area network (WAN), or a broadband network.

5. The mobile communications device of claim 1, wherein the second connection comprises:
a local network connection, and wherein the first connection comprises:
a connection to a cellular base station.

6. The mobile communications device of claim 1, wherein the femtocell system is further configured to start the first connection in response to ending the second mode of operation.

7. The mobile communications device of claim 1, wherein:
the second connection comprises a wireless local area network connection, and
the femtocell system is further configured to communicate additional communication signals originated by the mobile communications device and received from the cellular network via the second connection in the second mode of operation while the first connection is stopped.

8. A mobile communications device, comprising:
a wireless communications transceiver configured to connect to a cellular network via a first connection, the first connection being configured to provide a communication service between the mobile communications device and the cellular network;
a cellular transceiver configured to communicate with a second mobile communications device via a second connection in a first mode of operation and with the cellular network via a third connection in a second mode of operation, the second connection being configured to communicate communication signals between the cellular network and the second communications device via the mobile communications device and the first connection in the first mode of operation; and
a processor configured to stop the third connection in the first mode of operation.

9. The mobile communications device of claim 8, wherein the first connection comprises:
a local network connection and a connection to a cellular base station.

10. The mobile communications device of claim 9, wherein the cellular transceiver is further configured to route a call placed from the second mobile communications device through the local network connection via the first and second connections in the first mode of operation.

11. The mobile communications device of claim 8, further comprising:
a broadband transceiver configured to connect to the cellular network through a broadband network connection.

12. The mobile communications device of claim 8, wherein the cellular transceiver is further configured to communicate the communication signals conditioned upon a payment received from the second mobile communications device.

13. The mobile communications device of claim 8, further comprising:
a signal booster configured to boost a strength of signals transmitted and received by the cellular transceiver to provide a femtocell service to a third communications device.

14. The mobile communications device of claim 8, wherein:
the first connection comprises a wireless local area network connection, and
the cellular transceiver is further configured to communicate additional communication signals originated by the mobile communications device and received from the cellular network via the first connection in the first mode of operation while the third connection is stopped.

15. In a mobile communications device, a method comprising:
communicating with a cellular base station via a first connection in a first mode of operation;
connecting to a cellular network via a second connection through a local network in a second mode of operation;
providing femtocell service to a second mobile communications device via the second connection in the second mode of operation while the mobile communications device is moving within the local network; and
stopping the first connection in response to provision of the femtocell service in the second mode of operation.

16. The method of claim 15, where the connecting comprises:
connecting to a satellite network, a cable network, a digital video broadcasting (DVB) network, internet, a local area network (LAN), a wide area network (WAN), or a broadband network.

17. The method of claim 15, wherein the providing femtocell service further comprises:
providing the femtocell service in the second mode of operation conditioned upon a payment received from the second mobile communications device.

18. The method of claim 15, further comprising:
routing a call placed from the mobile communications device through the second connection in the second mode of operation.

19. The method of claim 15, further comprising;
providing the femtocell service to the mobile communications device via the second connection in the second mode of operation while the first connection is stopped.

20. The method of claim 15, further comprising:
concurrently providing femtocell service to a plurality of additional mobile communications devices via a corresponding plurality of connections in the second mode of operation.

* * * * *

UNITED STATES PATENT AND TRADEMARK OFFICE
CERTIFICATE OF CORRECTION

| | | |
|---|---|---|
| PATENT NO. | : 8,965,386 B2 | Page 1 of 1 |
| APPLICATION NO. | : 12/699465 | |
| DATED | : February 24, 2015 | |
| INVENTOR(S) | : Karaoguz et al. | |

It is certified that error appears in the above-identified patent and that said Letters Patent is hereby corrected as shown below:

In the Claims

Column 16, line 38, please replace "comprising;" with --comprising:--.

Signed and Sealed this
Sixteenth Day of June, 2015

Michelle K. Lee
*Director of the United States Patent and Trademark Office*